United States Patent
Van Der Plas

(10) Patent No.: US 6,409,377 B1
(45) Date of Patent: Jun. 25, 2002

(54) VERTICAL MIXING DEVICE FOR FODDER WITH INCLINED DISTRIBUTOR CONES

(75) Inventor: Nicolaas Van Der Plas, Oldenzaal (NL)

(73) Assignee: Trioliet Mullos B.V., Oldenzaal (NL)

( * ) Notice: Subject to any disclaimer, the term of this patent is extended or adjusted under 35 U.S.C. 154(b) by 0 days.

(21) Appl. No.: 09/818,937

(22) Filed: Mar. 27, 2001

(30) Foreign Application Priority Data

Jul. 25, 2000 (DE) .......................................... 200 12 862

(51) Int. Cl.⁷ .................................................. B01F 7/24
(52) U.S. Cl. ........................ 366/297; 366/305; 366/314; 366/603
(58) Field of Search ................................. 366/297, 298, 366/300, 301, 302, 305, 306, 307, 314, 318, 323, 603; 241/101.761, 101.8, 260.1

(56) References Cited

U.S. PATENT DOCUMENTS

| | | |
|---|---|---|
| 4,003,502 A | 1/1977 | Barcell |
| 4,593,861 A | 6/1986 | Blakley |
| 5,020,918 A | 6/1991 | Faccia |
| 5,175,917 A | 1/1993 | Faccia |
| 5,240,321 A | 8/1993 | Miller |
| 5,429,436 A | 7/1995 | Stone |
| 5,456,416 A | 10/1995 | Hartwig |
| 5,553,937 A | 9/1996 | Faccia |
| 5,553,938 A | 9/1996 | Faccia |
| 5,590,963 A | 1/1997 | Schuler |
| 5,647,665 A | 7/1997 | Schuler |
| 2001/0038573 A1 | 11/2001 | Knight |

FOREIGN PATENT DOCUMENTS

| | | |
|---|---|---|
| DE | 29716599 | 1/1998 |
| NL | 1006275 | 12/1998 |

*Primary Examiner*—Charles E. Cooley
(74) *Attorney, Agent, or Firm*—Darby & Darby

(57) ABSTRACT

A vertical mixing device for fodder includes a mixing chamber comprising at least two adjacent vertical augers provided in longitudinal direction of the mixing chamber one behind the other at the bottom and between essentially upright walls. Both vertical augers can be driven with the same sense of rotation in order to convey the fodder upwardly. In the wedge areas between the rotational courses of both vertical augers distributor cones are situated at the walls. The surface of each distributor cone comprises guiding surfaces extending with differing steepness from a bottom sided base situated within one wedge area to a tip positioned at least close to the wall. Each distributor cone is inclined obliquely towards one of the vertical augers the sense of rotation of which is directed towards this distributor cone.

11 Claims, 2 Drawing Sheets

VERTICAL MIXING DEVICE FOR FODDER WITH INCLINED DISTRIBUTOR CONES

BACKGROUND OF INVENTION

In a vertical mixing device as known from practice two vertical augers are provided the distributor cones of which are almost symmetrical because their upper tips are located vertically above the centers of their bases.

NL 10 06 275 A discloses a vertical mixing device comprising two vertical augers which can be driven with opposite senses of rotation. The vertical mixing device can be filled from the rear side. Both augers rotate with different speeds and are provided with an overlap between their rotation courses. They carry controlled conveying elements. Both distributor cones are symmetrical. The upper tip of each distributor cone is situated essentially vertical above the center of the bases.

In a vertical mixing device as known from U.S. Pat. No. 5,240,321 A, four vertical augers in total are provided in a series in the longitudinal direction of the mixing chamber. There are partial overlaps between the mutual rotational courses of the augers. Said mixing chamber can be filled from one end. The mixed fodder is expelled at the other end. During a mixing procedure the vertical mixing device is elevated at one of its ends.

It is conventional to fill the vertical mixing device either from the upper side by exterior means or to fill it with fodder by means of its own filling device situated at the rear end. In case that the mixing chamber is filled from above by exterior means, particularly between said vertical augers, first the fodder is distributed on both vertical augers. Each vertical auger forms a mound like a mole hill by its upward conveying effect during the mixing procedure. The distributor cones provided should prevent dead spaces in which the fodder is accumulated without motion and also should promote a transfer of the fodder from one vertical auger to the next one. Said distributor cones are for guiding the fodder from above, downwardly and inwardly to the auger lobes. However, the fodder also should move back and forth between both vertical augers in order to avoid irregular feed mixes. If the mixing chamber is filled from its rear end it is even more complicated with several vertical augers provided to distribute the latest loaded fodder part regularly within the mixing chamber. A regular mixture of the fodder hardly can be achieved by the known measures or only after an extremely long mixing duration.

A distributor cone as mentioned here is to be seen as a structure similar to one half of a four sided pyramid separated in a vertical diagonal plane. Said half pyramid is set with its partition plane to the longitudinal wall of the mixing chamber. The base sides and the outer surfaces of said pyramid can be concavely curved in the upward direction and/or in the horizontal direction. The concave curvature in horizontal direction can be made continuously or can consist of discrete straight sections. The upper tip of the distributor cone can be a true pointed tip or can be designed like a rounded peak.

It is an object of the invention to create a vertical mixing device of the kind as disclosed by which irrespective of the manner of filling the mixing chamber an intensive, regular mixture is achieved after relatively short mixing duration.

BRIEF DESCRIPTION OF THE INVENTION

By means of the oblique inclination of a distributor cone towards the vertical auger, the sense of rotation of which is directed towards said distributor cone, a significant part of the fodder is conveyed upwardly along the steeper guiding surface of the distributor cone. Said fodder part is then guided over the tip and over the edge extending towards the tip of the distributor cone to another guiding surface of the distributor cone and from there to the other vertical auger where it is taken up by said other vertical auger. In a top view of a well filled mixing chamber a continuous and quick oval circulation of the fodder can be seen which means that from each mound of one vertical auger a significant part of the fodder moves over to the other vertical auger. As a result, essentially identical feed mixes are achieved at each vertical auger as well as an intensified regular fodder mixing effect within the entire mixing chamber. This is achieved after a relatively short mixing duration. Contrary to a distributor cone, the tip of which is situated almost vertically above the center of the base and the guiding surfaces of which are symmetric, the steeper side surface of the distributor cone according to the invention generates unexpectedly strong rising tendencies for the fodder in co-action with the circumferential and upward conveying force components of the vertical auger feeding towards said distributor cone said force component guides considerable fodder parts quickly from one vertical auger over the distributor cone to the other vertical auger. Said vertical augers may be aligned in the longitudinal direction of the mixing chambers, or laterally or even obliquely. In each case it is expedient to provide distributor cones within the intermediate wedge areas of the vertical augers.

The inclination of the distributor cone structurally is achieved by displacing the upper tip, e.g. alongside the wall towards which the respective vertical auger is feeding. By said displacement the guiding surfaces of the cone have mutually different inclinations towards the tip. In relation to the vertical plane the distributor cone is made significantly asymmetrical. At the steeper guiding surface the fodder parts arriving from the vertical auger feeding towards said steeper guiding surface climb upwardly until they change over the tip and the upwardly directed edge to the other less steep guiding surface along which they slide downwardly and inwardly to the other vertical auger which then conveys the fodder further.

Expediently the tip of the distributor cone is offset by an extent leading to a geometrical relation according to which the boundary between the distributor cone and the longitudinal wall at the side remote from the auger feeding towards the distributor cone is essentially parallel to a line representing the upward taper of the vertical auger, when looking perpendicularly onto the longitudinal wall of the mixing chamber.

The guiding surfaces can be formed straight or can extend with a concave curvature in upward direction to the tip.

Furthermore, in a horizontal section of the distributor cone, the guiding surfaces may be curved concavely. Said curvature can be a uniform curvature or can consist of several straight section.

From the pointed end of the cone base extending into the wedge between the vertical augers an edge extends obliquely upwardly towards the sidewardly offset tip. Said edge defines a borderline of the less steep descending guiding surface towards the auger conveying the fodder away. The fodder which already changed over onto said less steep guiding surface slides down rapidly towards said vertical auger.

The pointed ends of both wedge areas expediently are located on a centre line extending laterally between the respective two vertical augers.

The wall, e.g. a longitudinal wall, at which the distributor cone is located may extend vertically or may be inclined outwardly, depending on the design of the vertical mixing device. The tip may be situated directly at the wall or can be distant from the wall and connected to it by a spacer or the like.

For easy manufacturing each distributor cone should be a construction of welded sheet metal which is prefabricated and secured e.g. to the longitudinal wall.

The tips of the distributor cones provided should be situated above the level of the free upper ends of both vertical augers in order to promote a lively circulation in case of a well filled mixing chamber. The inclined distributor cones are of advantage irrespective of whether the mixing chamber is to be filled from one end or by means of exterior means from the upper side and between both vertical augers.

In case of a large volume of the mixing chamber even more than two vertical augers may be provided one behind the other. Between respective two vertical augers the oppositely inclined distributor cones are provided. In this way even in a longer mixing chamber a lively oval circulation of the fodder is generated alongside the side walls and also at the expediently rounded terminal walls. It is to be noted that additionally a transfer of fodder also takes place directly between the vertical augers. Said fodder transfer contributes to the regularity of the feed mix.

BRIEF DESCRIPTION OF THE DRAWINGS

An embodiment of the invention is explained with the help of the drawing. In the drawing.

DETAILED DESCRIPTION OF THE INVENTION

Figure 1:
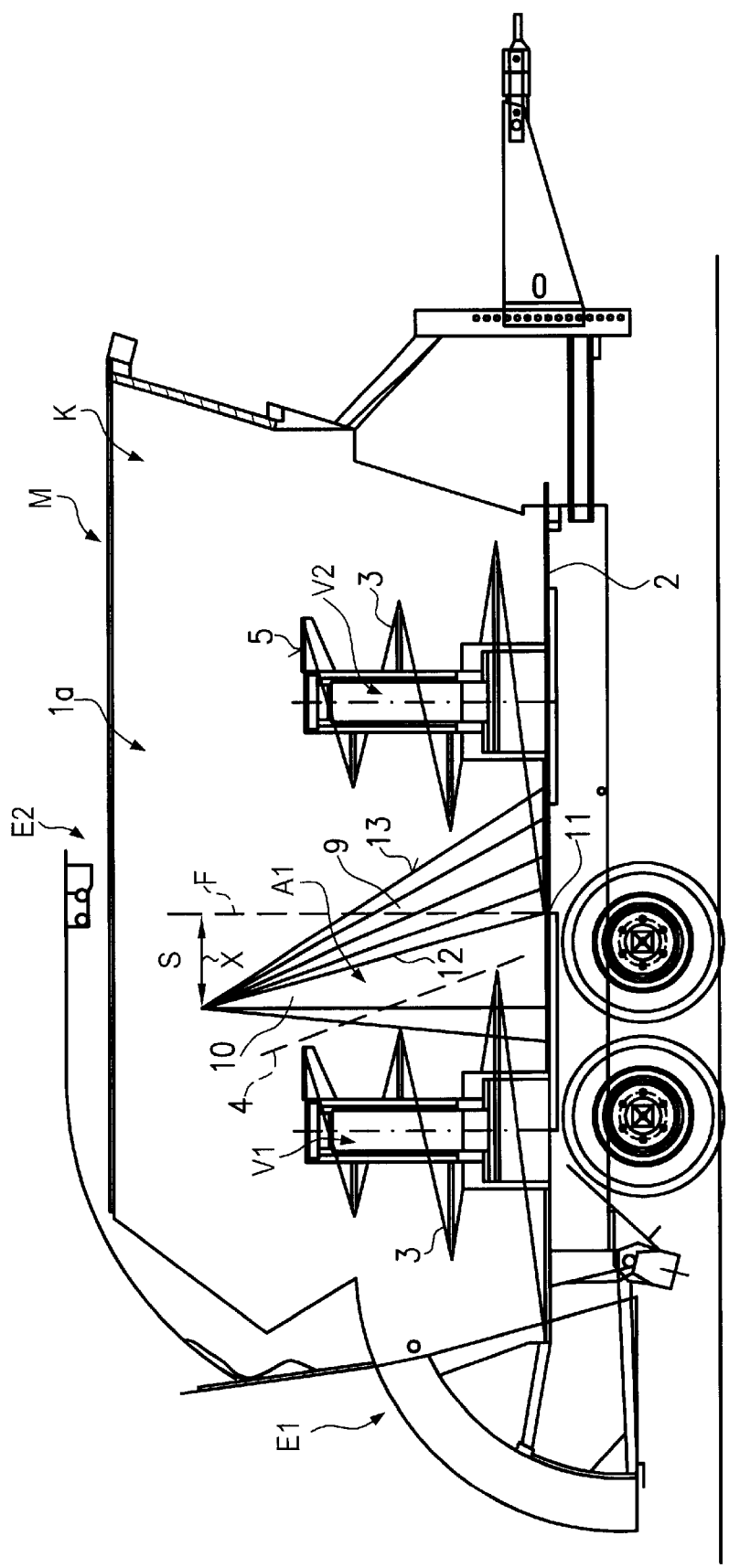
FIG. 1 is a longitudinal central section of a vertical mixing device.
Figure 2:
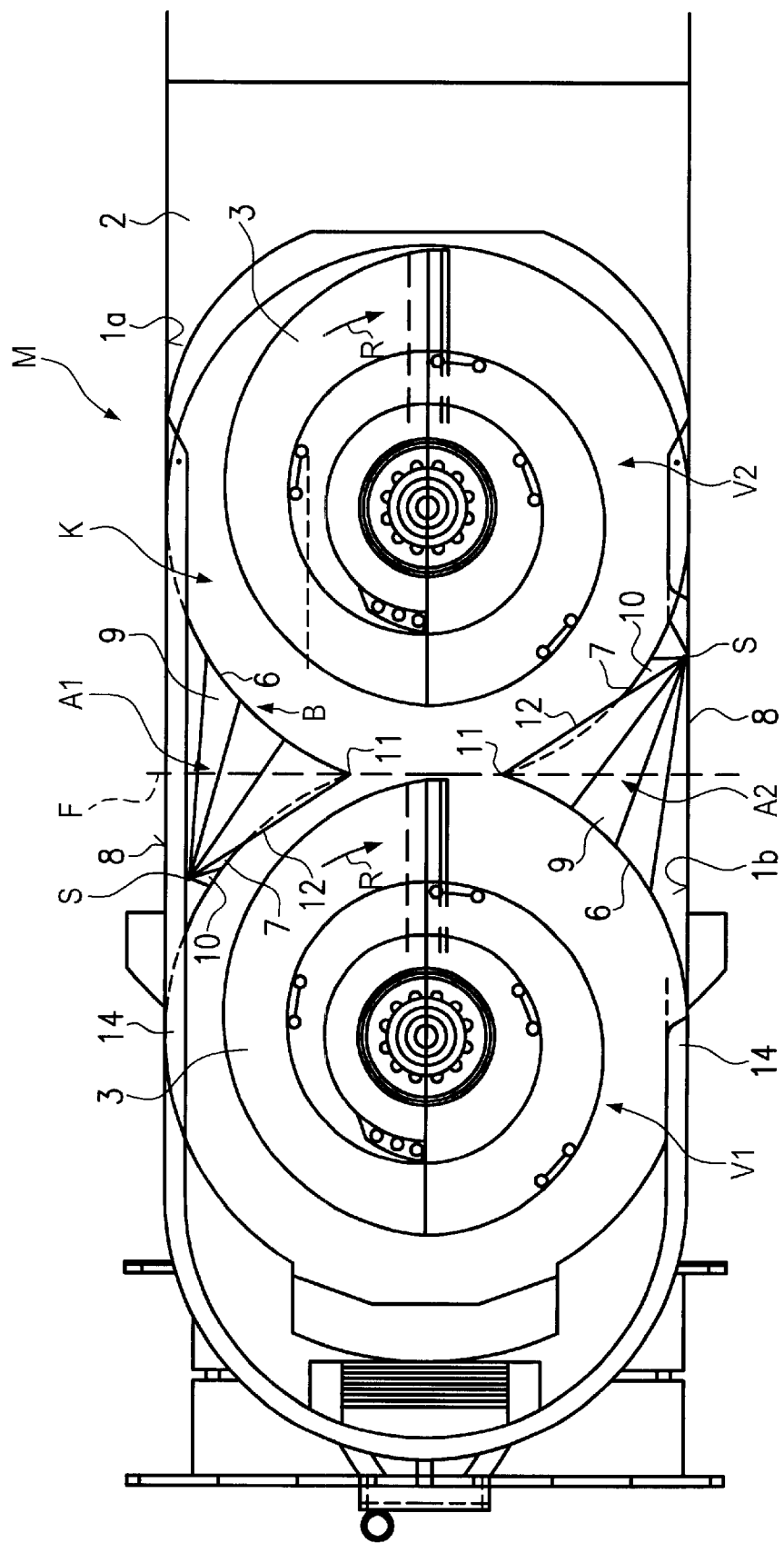
FIG. 2 a top view of the vertical mixing device.

In the embodiment of FIGS. 1 and 2 a vertical mixing device M comprises an oval mixing chamber K which is limited sidewardly by vertical walls 1a, 1b and a bottom 2 (walls 1a, 1b may be inclined inwardly or outwardly). At the rear end of mixing chamber K its own filling device E1 can be provided and/or at the upper side of mixing chamber K an exterior filling device E2. Within mixing chamber K, e.g. in longitudinal direction one behind the other, two vertical augers V1, V2 are provided, both having auger lobes 3 tapering upwardly to a respective free end 5. Dotted line 4 indicates in the longitudinal sectional view of FIG. 1 the taper of auger lobe 3. Both vertical augers V1, V2 can be driven by not shown drive means in the same sense of rotation R (in FIG. 2 the clockwise direction) such that they convey fodder upwardly. The rotational courses of both vertical augers V1, V2 close to the bottom are situated close to each other such that between both vertical augers wedge areas are defined which diverge towards walls 1a, 1b.

In both wedge areas distributor cones A1, A2 are situated at the respective walls 1a, 1b. Each distributor cone A1, A2 includes a bottom side base B bounded by concavely curved contours 6, 7 intersecting in a pointed region 11 and a straight base longitudinal side 8 at the respective wall 1a, 1b. Contours 6, 7 are located relatively close to said rotational courses, i.e., there are passages kept free which should not be too narrow.

Both pointed regions 11 expediently are situated on a lateral center line between the rotational courses of both vertical augers. A theoretical vertical plane F extending through said pointed regions 11 and the centers of the base longitudinal sides 8 serves as a reference plane for defining the asymmetry of said distributor cones A1, A2. The tip S of each distributor cone A1, A2 is put offset by a distance X in relation to said vertical plane F alongside the respective wall 1a, 1b towards the respective vertical auger V1 or V2, the sense of rotational R of which is directed towards the respective distributor cone A1 or A2. In other words the tip S of the respective distributor cone A1 or A2 is shifted in relation to said vertical plane F towards the one of said vertical augers V1 or V2 which rotates towards said distributor cone. Said distance X is selected such that a contour line 13 of the distributor cone A1 (in FIG. 1) at the side of tip S remote from the vertical auger V1 is essentially parallel to line 4 representing the taper of the auger lobe 3.

A less steep guiding surface 9 extends from said bases contour 6 to said tip S. Said guiding surface 9 is limited at one side by wall 1a or 1b respectively, and the other side by said edge 12. Another and steeper guiding surface 10 extends at the other side of edge 12 from said bases contour 7 to tip S. Also said guiding surface 10 is limited by said wall 1a or 1b respectively, and said edge 12. Both guiding surfaces 9, 10 are e.g. concave.

FIG. 2 shows in its upper part a wall edge 14 of mixing chamber K, which edge protrudes inwardly from said wall. In this case tip S of distributor cone A1 is located with a small distance in front of wall 1a and is connected with wall 1a by a ridge or spacer such that no fodder is allowed to enter between distributor cone A1 and said wall 1a.

In a different manner, in FIG. 2, lower part, tip S directly is positioned at wall 1b. For clarity reasons wall edge 14 is cut away in this part of the drawing. Walls 1a, 1b e.g. are the longitudinal walls of mixing chamber K.

The senses of rotation R of both vertical augers V1, V2 are the same, i.e. clockwise.

Operation

During a mixing operation within the filled mixing chamber K a part of the fodder within the mound covering vertical auger V1 increasingly moves upwardly along the steeper guiding surface 10. This is caused by conveying force components of vertical auger V1 in the direction of its sense of rotation R and also in upward direction co-acting with said sleeper guiding surface 10. This part of the fodder quickly moves over tip S and edge 12 on to the less steeply descending guiding surface 9 and slides along guiding surface 9 to the other vertical auger V2. Said other vertical auger V2 is taking said part of the fodder and works it into its mound. Similarly, a part of the fodder rises along the steeper guiding surface 10 of the other distributor cone A2 due to the feeding effect and the upwardly conveying effect of vertical auger V2. Also this part of the fodder quickly moves over tip S and edge 12 onto the less steeply descending guiding surface 9, slides along said guiding surface 9 downwardly and towards vertical auger V1 where it is taken from vertical auger V1. As a result a circulation of the fodder is generated with a circulation direction coinciding with the rotational senses R of both augers and alongside the walls. Said continuous circulation leads to regular mixing relationships at both vertical augers V1, V2 and a rapid mixing effect in the fodder within mixing chamber K. Other parts of the fodder content also are transferred within the wedge areas directly between both vertical augers.

What is claimed is:

1. Vertical mixing device for fodder, comprising:

a mixing chamber at the bottom of which between substantially upright walls at least two vertical augers are provided in a longitudinal direction of said mixing chamber, which vertical augers are driven with the same sense of rotation for mixing and conveying fodder upwardly, a distributor cone situated at each of said side walls in the wedge area between the rotational courses of both vertical augers, each distributor cone having guiding surfaces defining the surface of said distributor cone, said guiding surfaces extending from a cone bottom side base located in one of said wedge areas to an upper tip positioned at least close to a said side wall, each distributor cone being inclined obliquely to the corresponding one of said vertical augers, the rotational sense of which at the auger side of the said distributor cone is directed towards the said distributor cone.

2. Vertical mixing device as in claim 1, wherein said tip of each of said distributor cones is situated offset by a distance (X) from a vertical plane situated in the middle of both base longitudinal sides of the bases of both distributor cones closer to the vertical auger, the rotational sense of which is directed to the auger side of said distributor cone.

3. Vertical mixing device as in claim 2, wherein said tip of a said distributor cone is offset by a distance with respect to said vertical plane that a borderline of the said distributor cone at the side of the tip remote from said vertical plane extends alongside of the respective wall from said base of the said distributor cone to said tip of the said distributor cone essentially parallel to a line representing the taper of the auger lobe diameter in the upward direction and in a view perpendicular to the axes of both augers and in the middle between both vertical augers.

4. Vertical mixing device as in claim 1, wherein said guiding surfaces of a distributor cone extend from said base of the cone to said tip either straight or with a concave curvature.

5. Vertical mixing device as in claim 1, wherein said guiding surfaces of a distributor cone are curved concavely.

6. Vertical mixing device as in claim 1, wherein each of said distributor cones has two concave guiding surfaces that form an edge extending from a pointed region of said base of the cone upward to said tip, said base extending into a wedge area between both vertical augers.

7. Vertical mixing device as in claim 6, wherein a said pointed region of a distributor cone base is located on a lateral center line between both vertical augers.

8. Vertical mixing device as in claim 1, wherein each of said inclined distributor cones engages the respective wall that it opposes, which wall is one of vertical or inclined outwardly or inwardly within said mixing chamber.

9. Vertical mixing device as in claim 1, wherein each of said distributor cones is a welded sheet metal construction.

10. Vertical mixing device as in claim 1, wherein said tips of both distributor cones are situated above the level of the free upper ends of said vertical augers.

11. Vertical mixing device as in claim 1, further comprising a filling device at least at one longitudinal end of said mixing chamber and/or an exterior filling device at a top side of said mixing chamber and between said vertical augers.

* * * * *